(12) United States Patent
Sexton et al.

(10) Patent No.: US 7,331,275 B2
(45) Date of Patent: Feb. 19, 2008

(54) BRAKE BOOSTER WITH DEFORMATIONALLY SEALED PASSAGE AND METHOD OF MANUFACTURE

(75) Inventors: Roger S. Sexton, Dayton, OH (US); Philippe G. Castel, Paris (FR)

(73) Assignee: Delphi Technologies, Inc., Troy, MI (US)

( * ) Notice: Subject to any disclaimer, the term of this patent is extended or adjusted under 35 U.S.C. 154(b) by 136 days.

(21) Appl. No.: 11/257,691

(22) Filed: Oct. 25, 2005

(65) Prior Publication Data

US 2007/0089601 A1   Apr. 26, 2007

(51) Int. Cl.
*F16J 10/02* (2006.01)
(52) U.S. Cl. .................................... 92/169.3
(58) Field of Classification Search ............. 92/169.3
See application file for complete search history.

(56) References Cited

U.S. PATENT DOCUMENTS

| | | | |
|---|---|---|---|
| 2,562,336 A | 7/1951 | Selden | |
| 4,112,993 A | 9/1978 | Dey | |
| 4,339,921 A | 7/1982 | Schanz | |
| 5,090,298 A | 2/1992 | Gautier et al. | |
| 5,410,880 A | 5/1995 | Schluter | |
| 5,487,327 A | 1/1996 | Schluter et al. | |
| 6,189,437 B1 | 2/2001 | Morlan | |
| 6,314,865 B1 | 11/2001 | Henein et al. | |
| 6,539,837 B2 | 4/2003 | Fanelli et al. | |
| 6,561,077 B2 | 5/2003 | Castel et al. | |
| 6,588,317 B2 | 7/2003 | Petin et al. | |
| 6,623,048 B2 * | 9/2003 | Castel et al. | 91/376 R |

* cited by examiner

*Primary Examiner*—F. Daniel Lopez
(74) *Attorney, Agent, or Firm*—Scott A. McBain

(57) ABSTRACT

A brake booster apparatus having a housing with oppositely disposed first and second walls. A first connector is disposed in the first wall and a second connector is disposed in the second wall. An elongate hollow member is deformationally engaged to each of the first and second connectors. The various embodiments of the invention include embodiments wherein the hollow member is deformed to engage the hollow member and connectors and embodiments wherein the first and second connectors are deformed to engage the hollow member and connectors. The deformational engagement mechanically attaches and sealingly engages the hollow member with each of the first and second connectors. The hollow member defines a passage through the apparatus from the first wall to the second wall of the housing. A method of manufacturing a brake booster is also disclosed.

15 Claims, 8 Drawing Sheets

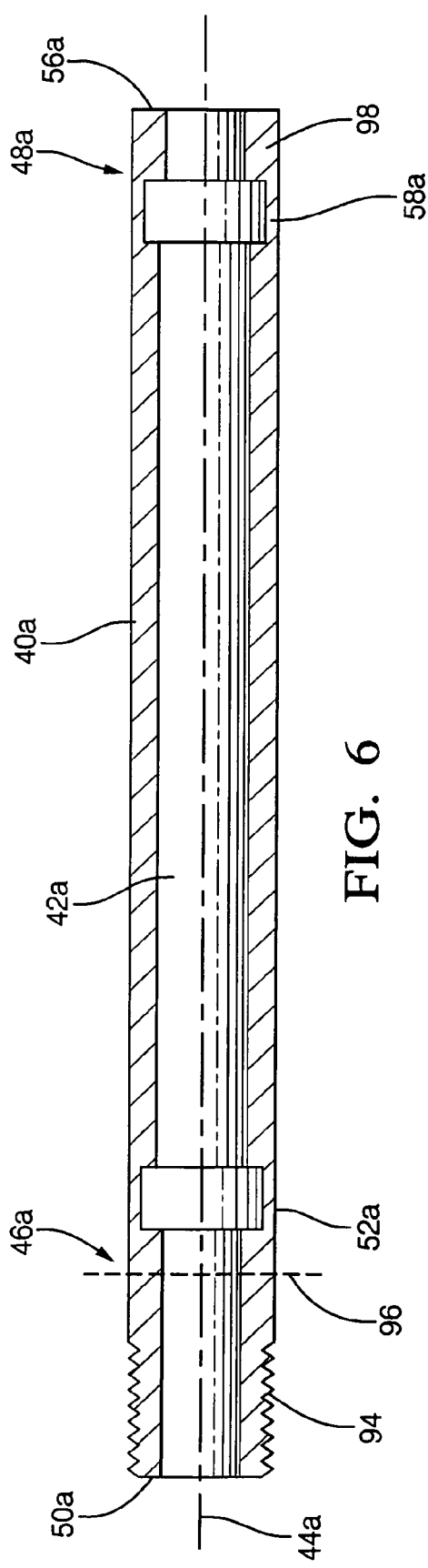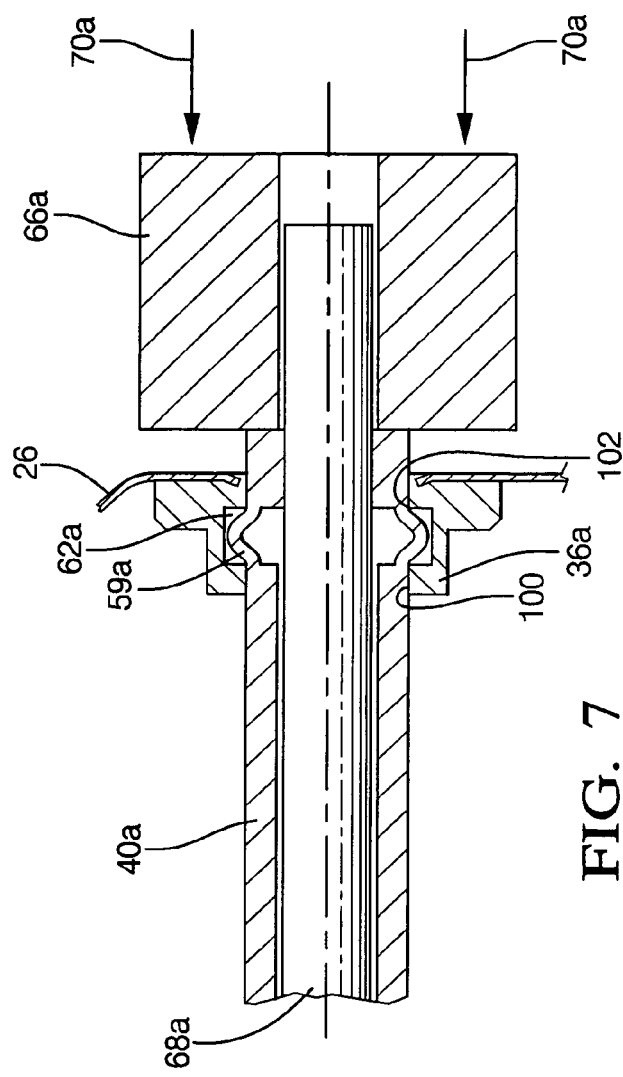
FIG. 6
FIG. 7

BRAKE BOOSTER WITH DEFORMATIONALLY SEALED PASSAGE AND METHOD OF MANUFACTURE

BACKGROUND OF THE INVENTION

1. Field of the Invention

The present invention relates to brake boosters and, more particularly, to a brake booster having a passage extending through the brake booster and methods of manufacturing such brake boosters.

2. Description of the Related Art

Many automobiles and light trucks employ a vacuum brake booster that increases the thrust force applied to the brake pedal by the operator of the vehicle. This increased force is imparted to the master cylinder to thereby provide a power-assisted braking system. Typically, the brake booster is attached to the firewall separating the engine compartment from the passenger compartment. The master cylinder is generally mounted on the brake booster opposite the firewall.

Different methods have been employed when mounting the brake booster to the firewall. One of the commonly employed methods involves providing one or more tubular passages that extend through the brake booster between the front and rear walls of the brake booster housing. Bolts are inserted through the tubular passages to secure the brake booster to the firewall.

One of the disadvantages associated with this method of installing a brake booster is that it requires a relatively complex, and thus costly, manufacturing process to provide the passages that extend through the brake booster housing. More specifically, ensuring the vacuum seal of the housing when installing the tube is often relatively complex. Although many advances have been made in this area, there remains a need for further improvement.

SUMMARY OF THE INVENTION

The present invention provides a brake booster assembly that has an elongate hollow member through which a bolt or similar fastener can be inserted. The hollow member is deformationally engaged with connectors disposed on opposing walls of the housing to thereby both mechanically fasten and sealingly engage the hollow member with the connectors. This eliminates the need for separate sealing members, such as O-rings, for the hollow member and thereby simplifies the manufacture of the brake booster.

The invention comprises, in one form thereof, a brake booster apparatus including a housing and an elongate hollow member. The housing has a first wall, an oppositely disposed second wall, and defines at least one chamber located between the first and second walls. A first connector is disposed on the first wall and a second connector is disposed on the second wall. The elongate hollow member is deformationally engaged to each of the first and second connectors. Either the hollow member or the first and second connectors may be deformed to provide the deformational engagement. This deformational engagement of the hollow member to the first and second connectors mechanically attaches and sealingly engages the hollow member with each of the first and second connectors. The hollow member defines a passage through the apparatus extending from the first wall to the second wall.

In one embodiment thereof, the brake booster apparatus has a hollow member that defines a longitudinal axis and has opposing axial end surfaces. The first and second connectors each define a radially inwardly opening annular recess and include an abutment surface disposed proximate and longitudinally outwardly of the annular recess. The axial end surfaces of the hollow member are engaged with the abutment surfaces. The hollow member also includes first and second deformed portions that are disposed proximate a respective one of the axial end surfaces wherein each of the first and second deformed portions project radially outwardly from the longitudinal axis into a respective one of the annular recesses and form therein a mechanical attachment and seal with the first and second connectors.

In another embodiment thereof, the brake booster apparatus has a hollow member that defines a longitudinal axis and includes first and second radially outwardly opening annular recesses. The first and second annular recesses are each disposed proximate a respective end of the hollow member. The hollow member also includes longitudinally outwardly facing first and second abutment surfaces disposed proximate and longitudinally inwardly of the first and second annular recesses. Each of the first and second connectors has a longitudinally inwardly projecting portion which are engaged with the first and second abutment surfaces respectively. The longitudinally inwardly projecting portions are deformed radially outwardly into the first and second annular recesses and form therein a mechanical attachment and seal between the first and second connectors and the hollow member.

In yet another embodiment thereof, the brake booster apparatus includes first and second connectors that each define a radially inwardly opening annular recess. The hollow member defines a longitudinal axis and extends through each of the first and second connectors. First and second opposing ends of the hollow member extend longitudinally outwardly from the housing through the first and second connectors respectively. The first and second ends of the hollow member each have an axial end surface and a deformed portion disposed longitudinally inwardly of the axial end surface. The deformed portions project radially outwardly into a respective one of the annular recesses of the first and second connectors to thereby mechanically secure the hollow member to the first and second connectors and form a seal therebetween.

The invention comprises, in another form thereof, a method of manufacturing a brake booster. The method includes providing a first housing section having a first connector disposed thereon, providing a second housing section having a second connector disposed thereon and joining the first housing section with the second housing section to form a chamber therebetween. The method also includes providing a hollow elongate member, deforming a portion of one of the hollow member and the first connector to mechanically attach and sealingly engage the hollow member and the first connector, and deforming a portion of one of the hollow member and the second connector to mechanically attach and sealingly engage the hollow member and the second connector.

An advantage of the present invention is that it provides a brake booster apparatus and a method of manufacturing a brake booster having an elongate hollow member that does not require a separate O-ring or other sealing member to seal the interface between hollow member and connectors located on opposite walls of the housing thereby simplifying the manufacture of the brake booster.

Another advantage, for some of the embodiments of the invention, is that the hollow member may have similarly configured opposite ends so that the hollow member can be installed without regard to the orientation of the its ends thereby simplifying the assembly of the brake booster and minimizing the possibility of incorrect installations of the hollow member.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein:

FIG. 6 is a cross sectional view of a second hollow member.

FIG. 7 is a schematic cross sectional view illustrating the deformational engagement of one end of the second hollow member with a connector.

Figure 1:
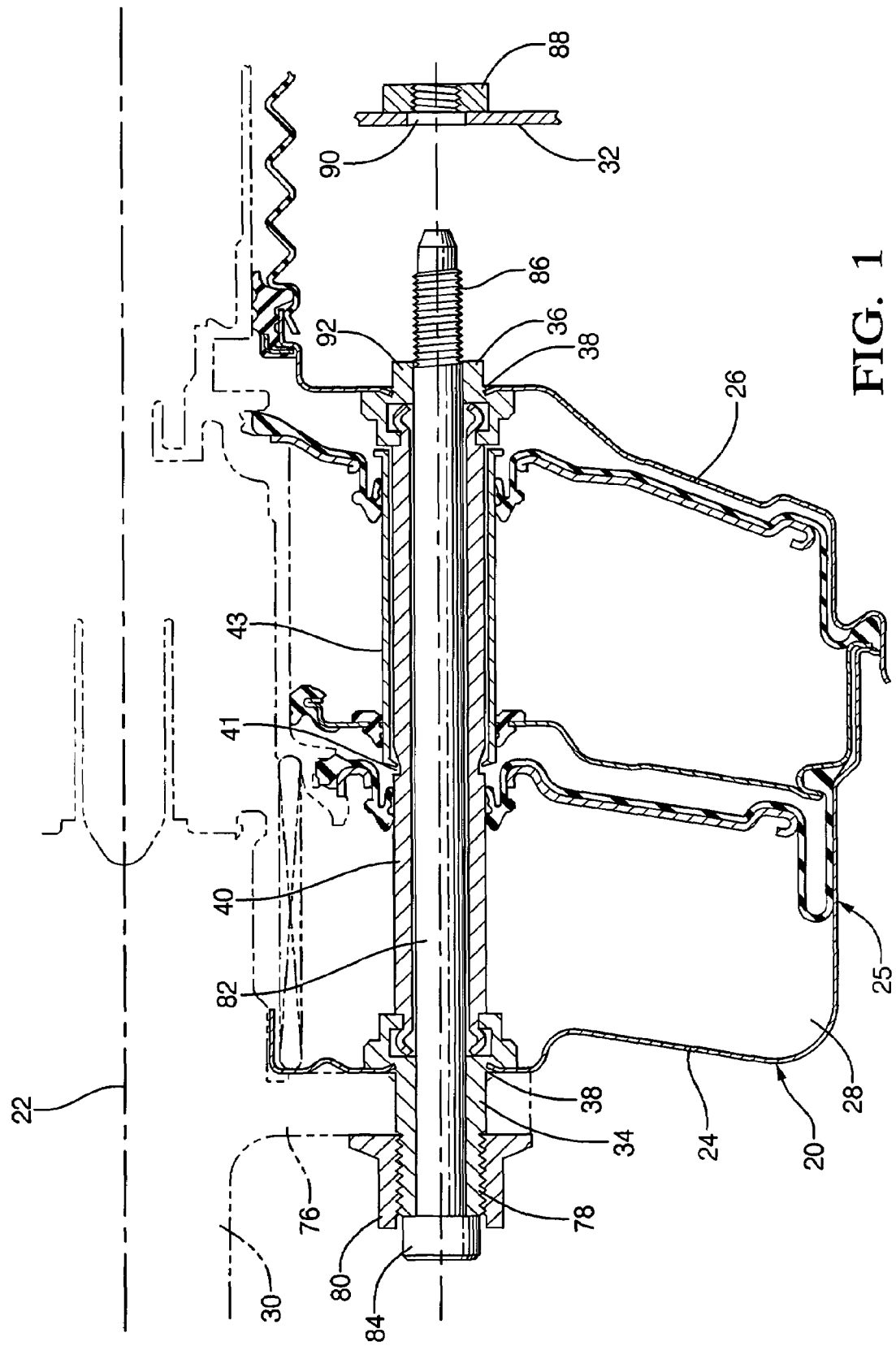
FIG. 1 is an exploded cross sectional view of a brake booster in accordance with the present invention.

Corresponding reference characters indicate corresponding parts throughout the several views. Although the exemplification set out herein illustrates embodiments of the invention in several forms, the embodiments disclosed below are not intended to be exhaustive or to be construed as limiting the scope of the invention to the precise forms disclosed.

DETAILED DESCRIPTION OF THE INVENTION

A vacuum assist brake booster 20 in accordance with the present invention is partially shown in FIG. 1. Brake booster 20 is symmetrical about centerline 22 and the second half of brake booster 20 is not illustrated. The housing 25 of brake booster 20 includes a front housing wall section 24 and an oppositely disposed rear housing wall section 26 which define a chamber 28 therebetween. A master cylinder 30 is attached to brake booster 20 adjacent front housing section 24 while the rear housing section 26 is positioned adjacent firewall 32.

In the illustrated embodiment, interior chamber 28 is subdivided into multiple chambers to provide a tandem vacuum brake booster. The present invention, however, is not limited to tandem brake boosters and may also be employed with single stage brake boosters. The general structure and operation of single stage and tandem vacuum brake boosters, as well as the structure and operation of master cylinders is well-known to those having ordinary skill in the art.

A front connector 34 is mounted in the front housing section 24 and a rear connector 36 is mounted in the rear housing section 26. Connectors 34, 36 are formed of steel, aluminum or other suitable material. Housing sections 24, 26 are each formed out of a sheet metal material, e.g., sheet steel, and connectors 34, 36 are respectively mounted in preformed apertures in housing sections 24, 26 utilizing a staking operation. More specifically, an axially projecting portion of connectors 34, 36 is staked radially outwardly and into engagement with the sheet metal material of housing sections 24, 26 to secure connectors 34, 36. A collar of material 38 on connectors 34, 36 that is deformed by the staking operation engages housing sections 24, 26 in a manner that mechanically secures connectors 34, 36 to housing sections 24, 26 and which forms a seal between connectors 34, 36 and housing sections 24, 26. This method of attaching a connector to a sheet metal housing wall is known in the art. For example, a method of attaching a connecting member to housing that can be used to attach connectors 34, 36 and form collars 38 is disclosed by Fanelli et al. in U.S. Pat. No. 6,539,837 B2 entitled APPARATUS AND METHOD OF ATTACHING A CONNECTING MEMBER AND A TUBE MEMBER TO A HOUSING OF A VACUUM BRAKE BOOSTER, the disclosure of which is expressly incorporated herein by reference.

Figure 2:
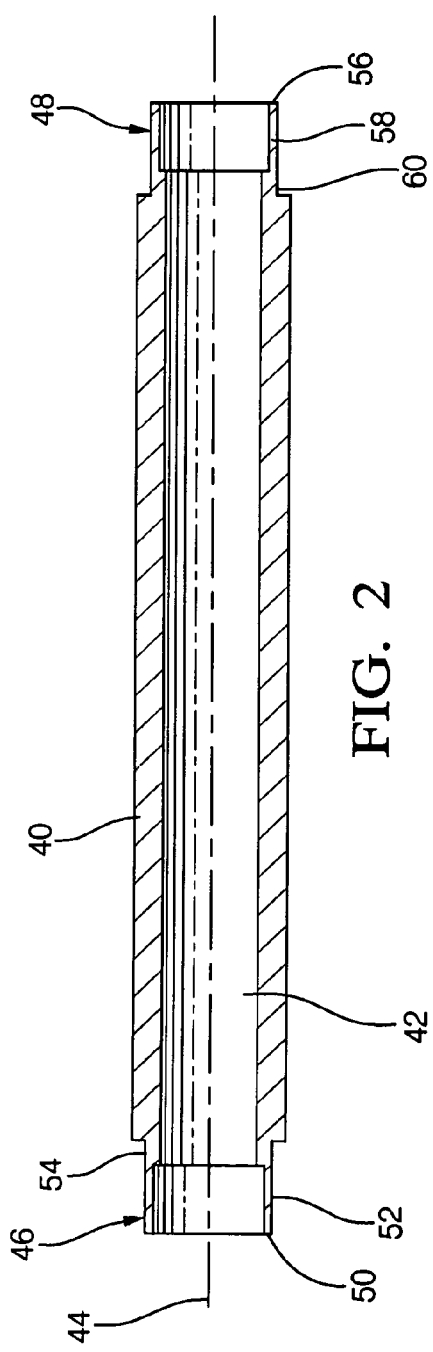
FIG. 2 is a cross sectional view of a first hollow member.

Extending between and attached to connectors 34, 36 is an elongate hollow member 40. FIG. 2 illustrates hollow member 40 in cross section prior to installation of hollow member 40 in brake booster 20. A passage 42 extends through the full length of member 40 and defines a longitudinal axis 44. First and second end portions 46, 48 define the opposing ends of hollow member 40. First end portion 46 includes a first axial end surface 50 and a relatively thin walled section 52 adjacent axial end surface 50. As can be seen in FIG. 2, hollow member 40 has a reduced outer diameter portion 54 near axial end surface 50. In the illustrated embodiment, thin walled section 52 is formed by both reducing the outer diameter of member 40 and enlarging the inner diameter of member 40 at section 52. Second end portion 48 has a configuration similar to first end portion with a second axial end surface 56, a relatively thin walled section 58 and a reduced outer diameter portion 60.

The similar configuration of end portions 46, 48 allows hollow member 40 to be non-directionally installed without regard to the orientation of its ends. In other words, end portions 46, 48 are interchangeable and hollow member 40 can be installed in a first configuration with first end portion 46 engaged with front connector 34 and second end portion 48 engaged with rear connector 36 or in a second orientation with first end portion 46 engaged with rear connector 36 and second end portion 48 engaged with front connector 34. This aspect of hollow member 40 facilitates the efficient manufacture of brake booster 20, by eliminating the need to determine which end of hollow tube 40 should be engaged with the front connector and which end should be engaged with the rear connector. It also facilitates the reduction of manufacturing errors resulting from improperly orienting hollow member 40 during installation.

It is noted that the hollow member 40 illustrated in FIG. 1 does include a recess 41 on its exterior surface that is used to interact with internal communication tube 43. The illustrated recess 41 does require a particular orientation of hollow member 40. Not all embodiments of brake booster 20, however, require the use of such a recess on hollow member 40. Moreover, it is envisioned that another such recess 41 could be added to hollow member 40 or recess 41 could be altered to allow hollow member 40 to be used with internal communication tube 43 with either first or second end portion 46, 48 being engaged with rear connector 36 to allow hollow member 40 to be properly installed without regard to orientation.

Figure 3:
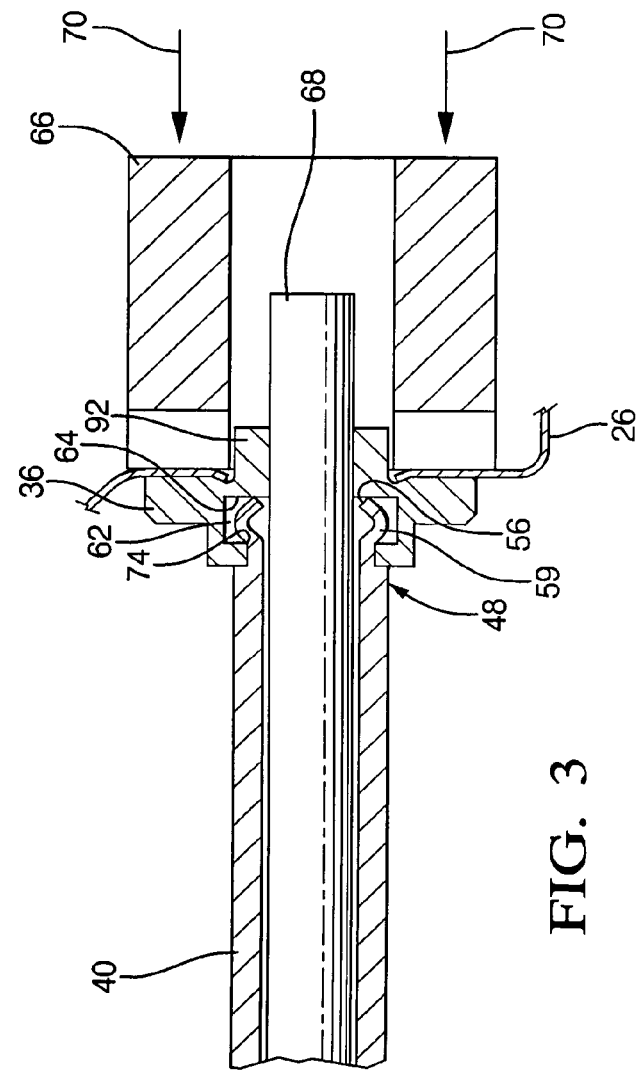
FIG. 3 is a schematic cross sectional view illustrating the deformational engagement of one end of the first hollow member with a connector.
Figure 4:
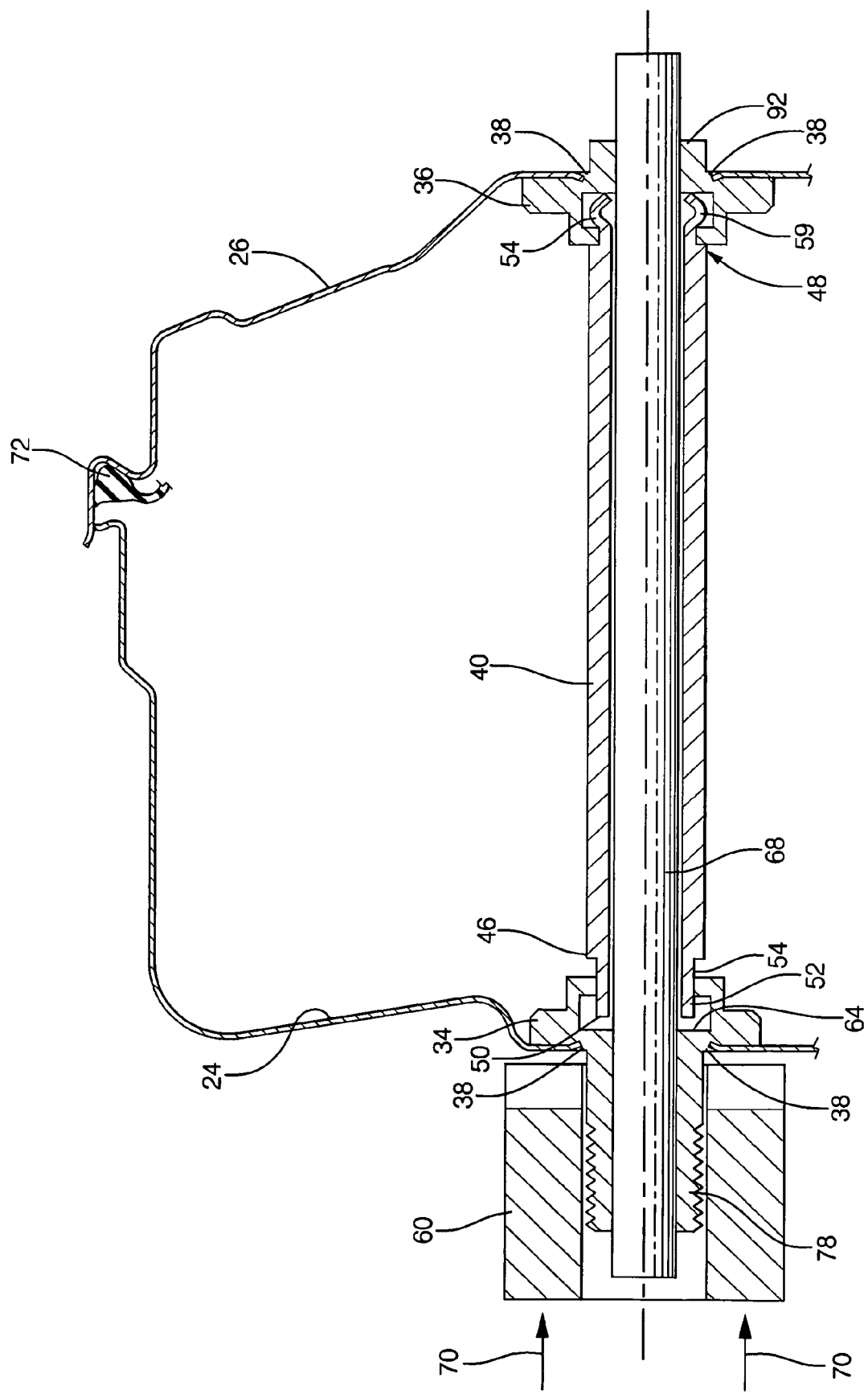
FIG. 4 is a schematic cross sectional view illustrating the assembly of a brake booster utilizing the first hollow member.
Figure 5:
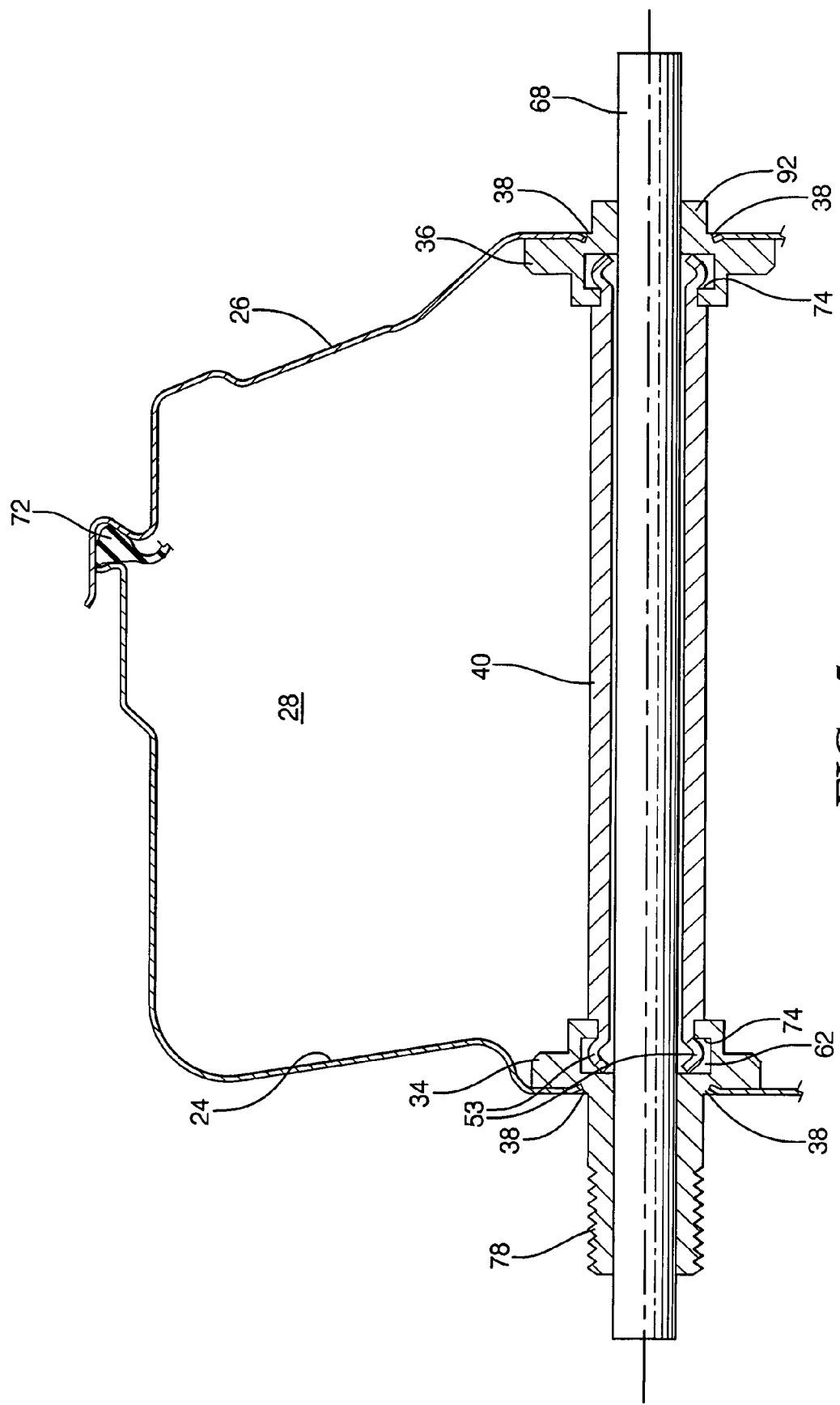
FIG. 5 is a schematic cross sectional view illustrating the first hollow member after installation in a brake booster.

The attachment of hollow member 40 to connectors 34, 36 is best understood with reference to FIGS. 3-5. Each of the connectors 34, 36 have a radially inwardly opening annular recess 62 and an abutment surface 64 located proximate the recess 62 and longitudinally outwardly of recess 62. With reference to FIG. 3, end portion 48 is deformationally engaged with connector 36 by inserting reduced diameter portion into connector 36 until axial end surface 56 engages abutment surface 64. Tooling 66 is used in the forcible engagement of surfaces 56 and 64. Hollow member 40 and connector 36 are forced together with sufficient force to buckle and deform thin walled section 58 as represented by arrows 70. A tooling rod 68 is positioned within passage 42 of hollow member 40 to prevent thin walled section 58 from deforming radially inwardly and thereby forces section 58 to deform radially outwardly into annular recess 62. Deformed portion 59, schematically illustrated in FIG. 3, is formed by this radially outward deformation of thin walled section 58.

As best seen in FIGS. 4 and 5, end portion 46 of hollow member 40 is attached to connector 36 in a similar manner. Tooling 66 is used to forcibly engage axial end surface 50 with abutment surface 64 of connector 36 as represented by arrows 70 in FIG. 4. Tooling rod 68 prevents thin walled section 52 from buckling inward. Instead, thin walled section 52 is deformed radially outwardly into annular recess 62 of connector 36 where it forms deformed portion 53 as schematically depicted in FIG. 5. After deformationally engaging hollow member 40 with both connector 34 and connector 36, tooling rod 68 is removed from passage 42. After removal of tooling rod 68, the first and second deformed portions 53, 59, which are disposed proximate the axial end surfaces 50, 56, mechanically attach hollow member 40 to connectors 34 and 36 and also form a seal with connectors 34, 36.

In the illustrated embodiment, deformational engagements between connectors 34, 36 and housing walls 24, 26 and between hollow member 40 and connectors 34, 36 form the sole means of mechanically attaching and sealing the hollow member 40 with respect to housing walls 24, 26. This arrangement beneficially eliminates the need to employ separate O-rings or other sealing members between either hollow tube 40 and connectors 34, 36 or between connectors 34, 36 and housing walls 24, 26 while still providing the seal and mechanical connection between these parts that is necessary for the proper operation of brake booster 20. The elimination of separate sealing components facilitates the cost efficient manufacture of brake booster 20.

The deformational engagement between hollow tube 40 and connector 34 occurs substantially contemporaneously with the joining together of first and second housing sections 24, 26 as best understood with reference to FIGS. 4 and 5. As can be seen in FIG. 5, as hollow tube 40 and connector 34 are forcibly engaged, housing sections 24, 26 are simultaneously moved toward each other and compress a seal member 72 therebetween. Seal member 72 may be formed integrally with a diaphragm of the brake booster. The sealing of a joint between two housing sections of a brake booster employing a seal member that is integrally formed out of a diaphragm of the brake booster is well known to those having ordinary skill in the art.

The deformational engagement of hollow member 40 with connector 34 also imparts a tensile load to the hollow member as it sealingly couples the first and second housing sections together with seal member 72. Conventional brake booster assemblies that employ tubes extending through the housing of the brake booster typically pre-stress the housing at the tube, i.e., they apply a tensile load to the tube, after properly positioning the tube in the housing. This generally requires that a pre-defined gap be left between the tube and the housing when installing the tube. By imparting a tensile load to hollow member 40 during the deformational engagement of hollow member 40 with connectors 34, 36, the manufacturing step of pre-stressing the brake booster housing is accomplished simultaneously with the installation of hollow member 40.

To accomplish this pre-stressing of the housing, deformed portions 53, 59 are load bearingly engaged with connectors, 34, 36 so that hollow member 40 transfers a tensile load between connectors 34, 36. For example, the tensile load may be transferred between deformed portions 53, 59 by frictional engagement between portions 53, 59 and connectors 34, 36 or by engagement of deformed portions 53, 59 with the longitudinally inward sidewalls 74 of recesses 62. It is noted that this tensile load is present when brake booster 20 is not operating. During operation of brake booster 20 various forces may act upon the housing, and, thus, hollow tube 40 will also be subjected to varying forces.

After brake booster 20 has been assembled, it is mounted in an automobile as schematically depicted in FIG. 1. Master cylinder 30, partially shown in dashed outline, includes a mounting flange 76 that has an opening through which a threaded projecting end 78 of connector 34 is inserted. A nut 80 having interior threads is secured to threaded end 78 to secure mounting flange 76 against front housing section 24. A similar nut 80 and mounting flange 76 are located on the opposite side of centerline 22 and are secured to another connector 34 to thereby secure master cylinder 30 to brake booster 20.

A bolt 82 is inserted through passage 42 defined by hollow member 40 to secure brake booster 20 to firewall 32. Bolt head 84 engages connector 34 while the opposite threaded end 86 of bolt 82 engages a threaded nut 88 which is secured, e.g., by welding, to firewall 32. Firewall 32 separates the engine compartment, in which brake booster 20 is located, from the passenger compartment of the vehicle in which booster 20 is being installed. Firewall 32 also defines a guide hole 90 that receives projecting collar 92 on connector 36. The insertion of collar 92 into guide hole 90 facilitates the proper positioning of brake booster 20 on firewall 32 when securing booster 20 with bolts 82.

Figure 8:
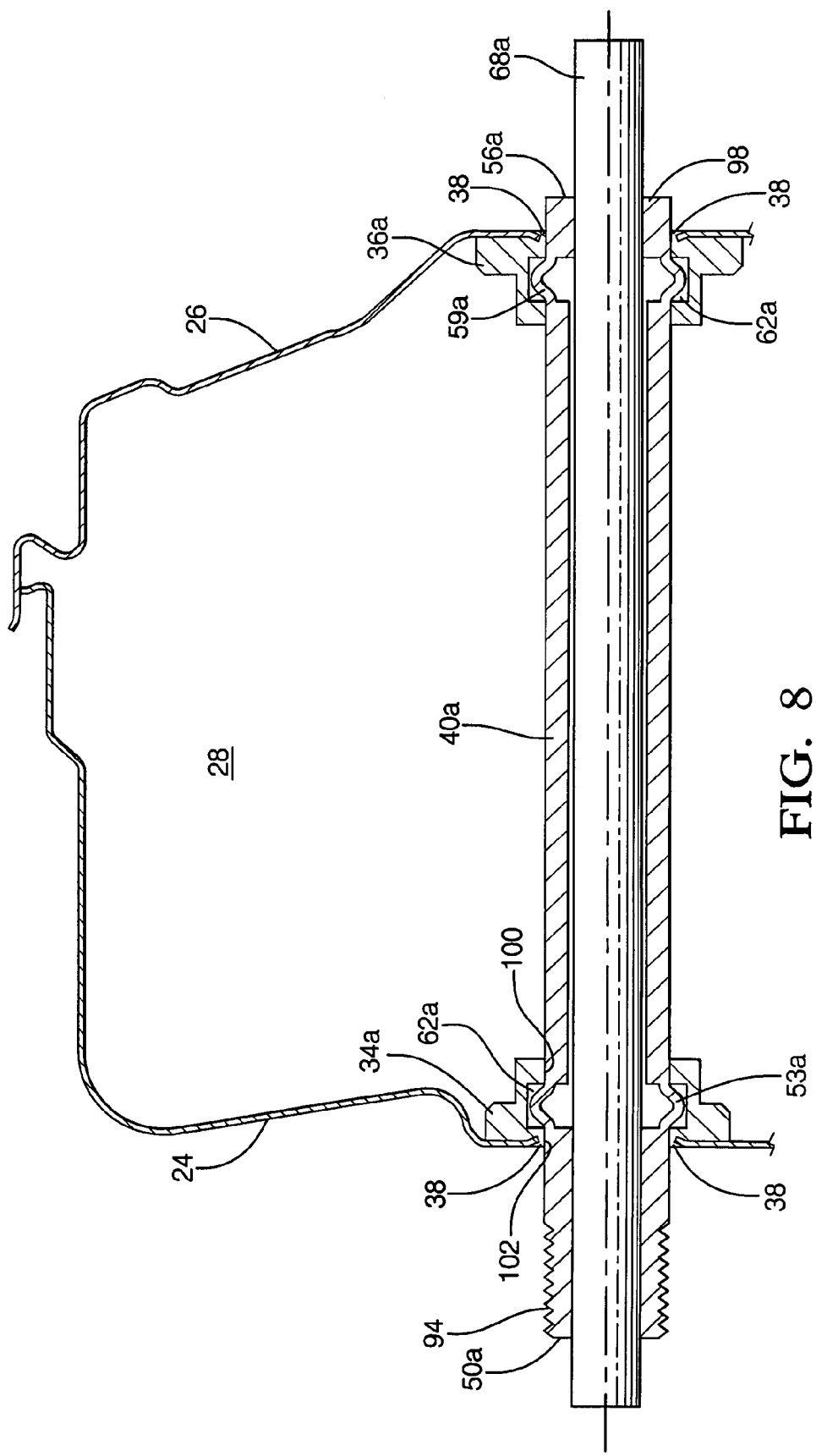
FIG. 8 is a schematic cross sectional view illustrating the second hollow member after installation in a brake booster.

A second embodiment of the invention is illustrated in FIGS. 6-8. This embodiment utilizes a hollow member 40*a* and connectors 34*a*, 36*a* that differ from those of the first embodiment. As best seen in FIG. 6, hollow member 40*a* has a passage 42*a* extending therethrough and defines a longitudinal axis 44*a*. Hollow member 40*a* also includes first and second opposing ends 46*a*, 48*a* that terminate, respectively, at first and second axial end surfaces 50*a*, 56*a*. Hollow member 40*a* includes first and second relatively thin walled sections 52*a*, 58*a* that are disposed proximate but spaced inwardly from axial end surfaces 50*a*, 56*a*. Hollow tube 40*a* is cylindrical with a constant wall thickness except at thin walled sections 52*a*, 58*a* where annular recesses on the inner surface of hollow tube 40*a* reduce the thickness of the hollow member 40*a*.

Connectors 34*a*, 36*a* each have a radially inwardly opening annular recess 62*a* and define cylindrical passages 100, 102 located, respectively, longitudinally inwardly and outwardly of the annular recesses 62*a*. The inner diameter of the cylindrical passages 100, 102 each have a substantially common value which is greater than the maximum outer diameter defined by non-deformed portions of the hollow member 40a, i.e., all portions of hollow member 40a except deformed portions 53a, 59a. This allows hollow tube 40a to be inserted through connectors 34a, 36a prior to the attachment of hollow member 40a to connectors 34a, 36a.

During assembly of the brake booster, thin walled sections 52a, 58a form first and second deformed portions 53a, 59a which mechanically secure hollow member 40a to connectors 34a, 36a and form a seal between hollow member 40a and each of connectors 34a, 36a. A tensile load may also be applied to hollow tube 40a at this time to pre-stress the brake booster housing as described above.

The attachment of hollow tube 40a to connector 36a is schematically depicted in FIG. 7. Tooling 66a is used to impart an axial load to hollow tube 40a by bearing on axial end surface 56a as represented by force arrows 70a. Hollow member 40a may is gripped by another tooling member, not shown, at a location between thin walled sections 52a, 58a to resist this axial load. This axial force buckles thin walled section 58a to formed deformed portion 59a. Tooling rod 68a prevents the radially inward deformation of thin walled section 58a and ensures that deformed portion 59a projects radially outwardly into annular recess 62a. After joining hollow member 40a to connector 36a, the front and rear housing sections 24, 26 are joined together. The joining of the housing sections 24, 26 positions connector 34a whereby thin walled section 52a can be deformed radially outwardly to join hollow tube 40a and connector 34a.

As seen in FIG. 8, when the brake booster is assembled, opposing ends 46a, 48a extend through connectors 34a, 36a and extend outwardly from the housing. End 46a includes a threaded surface 94 which allows nut 80 securing master cylinder 30 to be directly attached to hollow member 40a. Opposite end 48a projects outwardly of rear housing section 26 and is inserted into guide hole 90 when mounting the brake booster to firewall 32. Dashed line 96 illustrates where end portion 46a could be alternatively terminated to provide a hollow member 40a that has opposing ends with substantially similar configurations.

Figure 9:
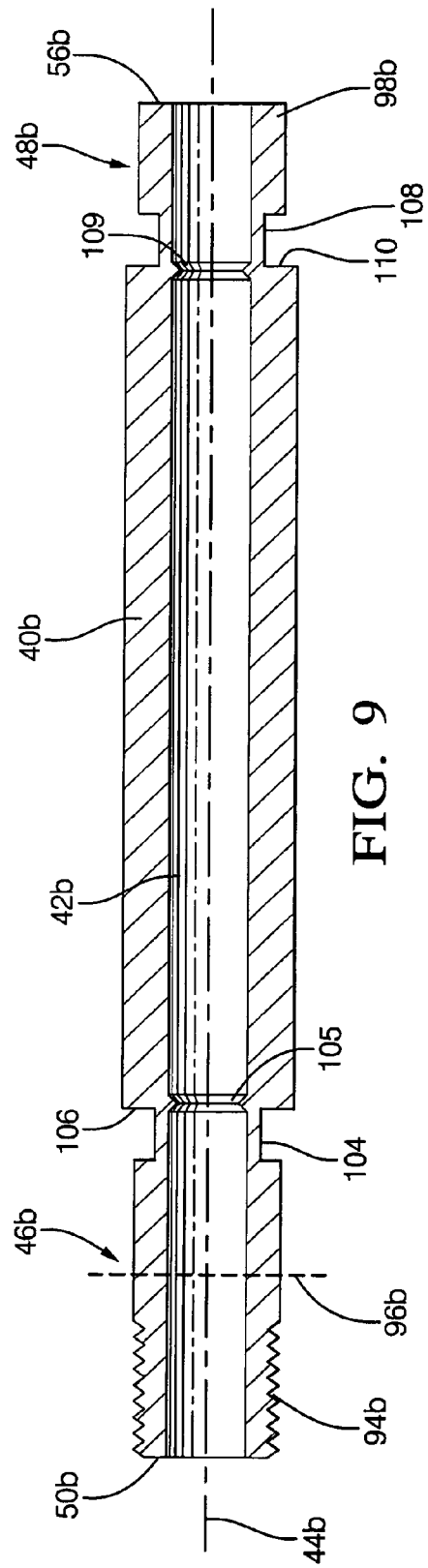
FIG. 9 is a cross sectional view of a third hollow member.
Figure 10:
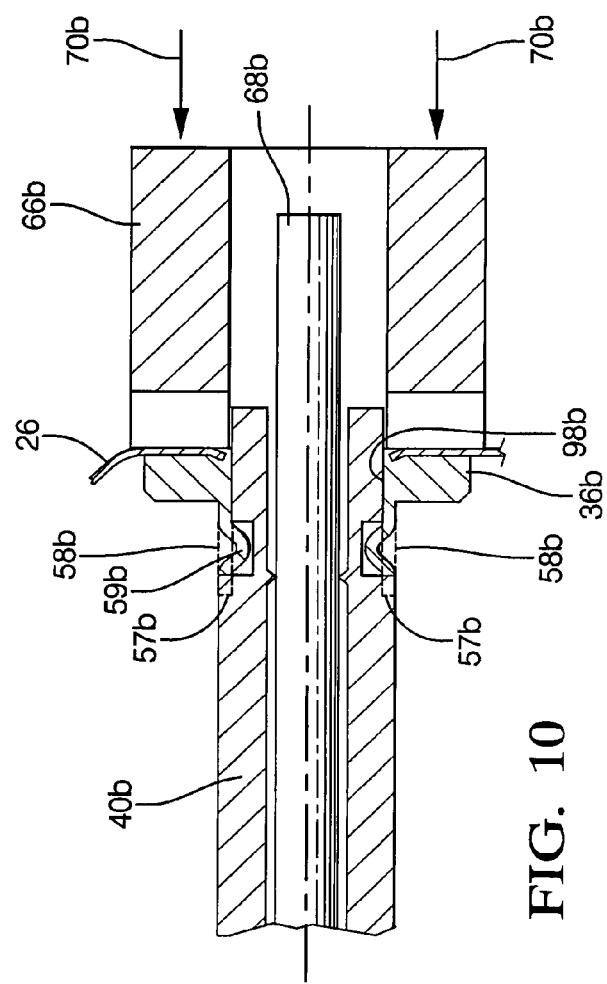
FIG. 10 is a schematic cross sectional view illustrating the deformational engagement of one end of the third hollow member with a connector.
Figure 11:
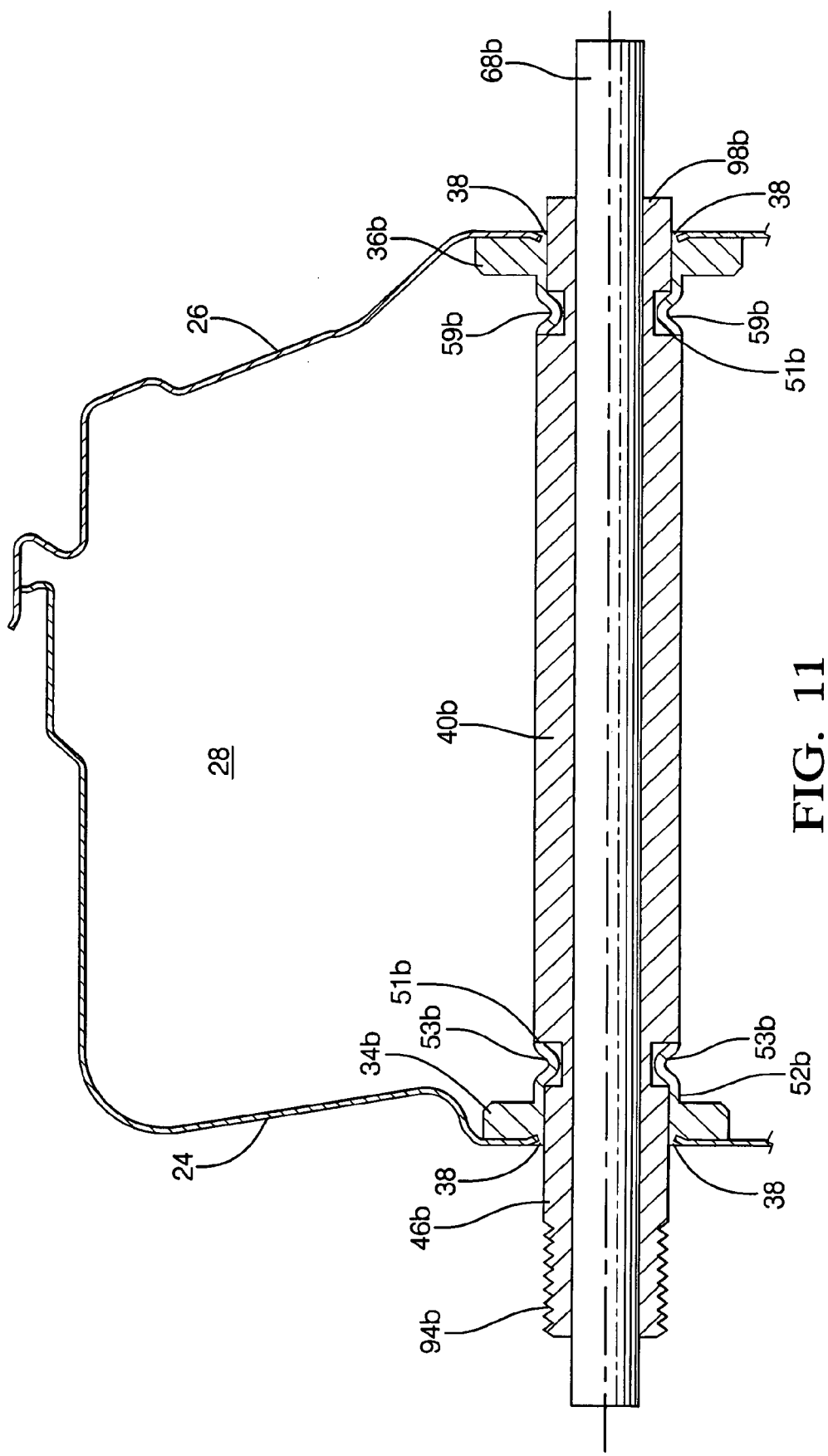
FIG. 11 is a schematic cross sectional view illustrating the third hollow member after installation in a brake booster.

A third embodiment of the invention is illustrated in FIGS. 9-11 and employs hollow member 40b and connectors 34b, 36b. In this embodiment, a portion of connectors 34b, 36b is deformed when securing hollow member 40b to the connectors 34b, 36b. As seen in FIG. 9, hollow member 40b has a passage 42b extending therethrough and defines a longitudinal axis 44b. The opposing end portions 46b, 48b of hollow member 40b respectively terminate at axial end surfaces 50b, 56b. Hollow member 40b also includes first and second radially outwardly opening annular recesses 104, 108 that are respectively disposed proximate axial end surfaces 50b, 56b. That portion of hollow member 40b located between annular recesses 104, 108 has a relatively large outer diameter that is greater than the outer diameter of end portions 46b, 48b located longitudinally outwardly of recesses 104, 108. This allows the distal portion of end portions 46b, 48b to be inserted through connectors 34b, 36b and also allows the inner sidewalls of recesses 104, 108 to form longitudinally outwardly facing abutment surfaces 106, 110 at a location longitudinally inward of the recesses 104, 108. In otherwords, recess 104 is located between axial end surface 50b and abutment surface 106 and recess 108 is located between axial end surface 56b and abutment surface 110. Hollow member 40b also includes two radially inwardly extending stiffening ribs 105, 109 disposed proximate first and second annular recesses 104, 108, respectively, to enhance the strength of hollow member 40a.

Connectors 34b, 36b each include a longitudinally inwardly projecting portion 52b, 58b that is deformed radially outwardly into the annular recesses 104, 108 on hollow member 40b by forcibly engaging the axial end surfaces, 51b, 57b of projecting portions 52b, 58b with abutment surfaces 106, 110. Each of the connectors 34b, 36b have the same configuration with a substantially cylindrical projecting portion 52b, 58b. Dashed outline 57b shown in FIG. 10 illustrates the configuration of projecting portion 58b before it is deformed into engagement with hollow member 40b.

Projecting portions 52b, 58b are deformed radially inwardly by the forcible engagement of axial end surfaces 51b, 57b with abutment surfaces 106, 110 respectively. Tooling 66b is used to forcibly press the connectors into engagement with hollow member 40b as schematically represented by arrows 70b in FIG. 10. Tooling rod 68b is used to ensure that hollow member 40b is not bent out of alignment during the engagement of hollow member 40b with connectors 34b, 36b. The resulting deformed portions 53b, 59b project into annular recesses 104, 108 where they engage hollow member 40b and thereby mechanically attach and form a seal between hollow member 40a and connectors 34b, 36b. After hollow member 40b and connector 36b are joined together, connector 34b is joined to the opposite end of hollow member 40b as best understood with reference to FIG. 11. Connector 34b is joined to housing section 24 before being joined to hollow member 40b and, thus, housing sections 24 and 26 are sealingly joined together simultaneously with the joining of hollow member 40b and connector 34b. A sealing member (not shown in FIG. 11) is used to sealingly couple housing sections 24, 26 as described above with reference to the first embodiment. It is also advantageous to generate a tensile load in hollow member 40b when securing connector 34b to thereby prestress the brake booster housing as described in greater detail above.

As can be seen in FIG. 11, end portions 46b, 48b of hollow member 40b extend through connectors 34b, 36b and project longitudinally outwardly of housing 25. Projecting end 46b has a threaded surface 94 so that mounting flange 76 can be positioned over projecting end 46b and nut 80 can be secured directly to hollow member 40b when mounting master cylinder 30 to brake booster 20. Projecting end 98b defines a collar that is inserted into guide opening 90 when mounting brake booster 20 on firewall 32. Dashed line 96b illustrates where end portion 46b could be alternatively terminated to provide a hollow member 40b that has opposing ends with substantially similar configurations.

While this invention has been described as having an exemplary design, the present invention may be further modified within the spirit and scope of this disclosure. This application is therefore intended to cover any variations, uses, or adaptations of the invention using its general principles.

What is claimed is:

1. A brake booster apparatus, said apparatus comprising:
   a housing, said housing having a first wall and an oppositely disposed second wall, said housing further defining at least one chamber disposed between said first and second walls;
   a first connector disposed on said first wall and including a longitudinally inwardly projecting portion;
   a second connector disposed on said second wall and including a longitudinally inwardly projecting portion;
   an elongate hollow member having opposing ends and defining a longitudinal axis and first and second radially outwardly opening annular recesses, said first and second annular recesses each disposed proximate a respective one of said opposing ends of said hollow member, said hollow member further comprising longitudinally outwardly facing first and second abutment surfaces disposed proximate and longitudinally inwardly of said first and second annular recesses respectively, said hollow member being engaged with each of said first and second connectors, said engagements between said hollow member and said first and second connectors each being a deformational engagement that mechanically attaches and sealingly engages said hollow member with each of said first and second connectors; said hollow member further defining a passage through said apparatus from said first wall to said second wall, wherein said longitudinally inwardly projecting portions of each of said first and second connectors are engaged with said first and second abutment surfaces respectively, said longitudinally inwardly projecting portions being deformed radially inwardly into said first and second annular recesses respectively and forming therein a mechanical attachment and seal between said first and second connectors and said hollow member.

2. The apparatus of claim 1 wherein said hollow member has a first radially inwardly extending annular rib disposed proximate said first annular recess and a second radially inwardly extending annular rib disposed proximate said second annular recess.

3. The apparatus of claim 1 wherein said hollow member is load bearingly engaged with each of said first and second connectors and wherein, when said apparatus is in a non-operating condition, said hollow member transfers a tensile load between said first and second connectors.

4. The apparatus of claim 1 wherein said first and second walls are each formed of sheet metal and said first and second connectors are deformationally engaged with said first and second walls respectively, said deformational engagement of said first and second connectors with said first and second walls mechanically attaching and sealingly engaging said first and second connectors with said first and second wall respectively and wherein said respective deformational engagement of said first and second connectors with said first and second walls and said deformational engagement of said hollow member with said first and second connectors provides the sole means for mechanical attaching and sealing said hollow member with respect to said first and second walls.

5. The apparatus of claim 1 wherein said hollow member includes at least one end extending through a respective one of said first and second connectors and projecting longitudinally outwardly from said housing.

6. The apparatus of claim 5 wherein said at least one end has a threaded surface.

7. A method of manufacturing a brake booster, said method comprising:

providing a first housing section having a first connector disposed thereon, said first connector including a first inwardly projecting portion;

providing a second housing section having a second connector disposed thereon, said second connector including a second inwardly projecting portion;

joining the first housing section with the second housing section to form a chamber therebetween;

providing a hollow elongate member including first and second opposing ends and first and second radially outwardly opening annular recesses, the first and second recesses located proximate the first and second ends respectively, the hollow member further including first and second abutment surfaces, the first recess disposed between the first end and the first abutment surface, the second recess disposed between the second end and the second abutment surface;

engaging the first inwardly projecting portion with the first abutment surface to deform the first inwardly projecting portion radially inwardly into the first annular recess, thereby mechanically attaching and sealingly engaging the hollow member and the first connector; and engaging the second inwardly projecting portion with the second abutment surface to deform the second inwardly projecting portion radially inwardly into the second annular recess, thereby mechanically attaching and sealingly engaging the hollow member and the second connector.

8. The method of claim 7 wherein said step of engaging the first inwardly projecting portion with the first abutment surface occurs no later than said step of engaging the second inwardly projecting portion with the second abutment surface; and wherein said step of engaging the second inwardly projecting portion with the second abutment surface occurs substantially contemporaneously with said step of joining the first housing section with the second housing section.

9. The method of claim 8 wherein said step of engaging the second inwardly projecting portion with the second abutment surface imparts a tensile load to the hollow member and sealingly couples the first housing section with the second housing section.

10. The method of claim 7 wherein the hollow member includes at least one threaded end; the threaded end projecting outwardly from the first housing section after attaching the hollow member to the first and second connectors; and wherein said method further comprises:

attaching a master cylinder to the brake booster by positioning a portion of the master cylinder proximate the at least one threaded end of the hollow member and threadingly engaging the at least one threaded end of the hollow member with a threaded fastener.

11. A brake booster apparatus, said apparatus comprising:

a housing, said housing having a first wall and an oppositely disposed second wall, said housing further defining at least one chamber disposed between said first and second walls;

a first connector disposed on said first wall and defining a radially inwardly opening annular recess;

a second connector disposed on said second wall and defining a radially inwardly opening annular recess;

an elongate hollow member defining a longitudinal axis and including first and second opposing ends defining first and second axial end surfaces respectively, said hollow member being engaged with each of said first and second connectors, said engagements between said hollow member and said first and second connectors each being a deformational engagement that mechanically attaches and sealingly engages said hollow member with each of said first and second connectors; said hollow member further defining a passage through said apparatus from said first wall to said second wall, wherein said hollow member extends through each of said first and second connectors, and wherein said first and second opposing ends extend longitudinally outwardly from said housing through said first and second connectors respectively, said hollow member having first and second deformed portions respectively spaced longitudinally inwardly of said first and second axial end surfaces and projecting radially outwardly into a respective one of said annular recesses of said first and second connectors to thereby mechanically secure said hollow member to said first and second connectors and form a seal therebetween.

12. The apparatus of claim 11 wherein said first and second connectors each define cylindrical passages longitudinally inwardly and longitudinally outwardly of said annular recess, each of said cylindrical passages defined by said first and second connectors defining an inner diameter having a substantially common value; said common value being greater than a maximum outer diameter defined by non-deformed portions of said hollow member.

13. The apparatus of claim 11 wherein at least one of said first and second ends of said hollow member projecting longitudinally outwardly of said housing has a threaded surface.

14. A method of manufacturing a brake booster, said method comprising:
providing a first housing section having a first connector disposed thereon, said first connector including a radially inwardly opening annular recess;
providing a second housing section having a second connector disposed thereon, said second connector including a radially inwardly opening annular recess;
joining the first housing section with the second housing section to form a chamber therebetween;
providing a hollow elongate member including first and second opposing ends and first and second relatively thin walled sections respectively disposed inwardly and proximate the first and second ends;
deforming a portion of one of the hollow member and the first connector to mechanically attach and sealingly engage the hollow member and the first connector, said step of deforming a portion of one of the hollow member and the first connector including deforming the first relatively thin walled section radially outwardly into the annular recess of the first connector wherein the first end of the hollow member projects outwardly from the first housing section after deforming the first thin walled section; and
deforming a portion of one of the hollow member and the second connector to mechanically attach and sealingly engage the hollow member and the second connector, said step of deforming a portion of one of the hollow member and the second connector including deforming the second relatively thin walled section radially outwardly into the annular recess of the second connector wherein the second end of the hollow member projects outwardly from the second housing section after deforming the second thin walled section.

15. A method of manufacturing a brake booster, said method comprising:
providing a first housing section having a first connector disposed thereon;
providing a second housing section having a second connector disposed thereon;
joining the first housing section with the second housing section to form a chamber therebetween;
providing a hollow elongate member, said hollow member including at least one threaded end, the threaded end projecting outwardly from the first housing section after attaching the hollow member to the first and second connectors;
deforming a portion of one of the hollow member and the first connector to mechanically attach and sealingly engage the hollow member and the first connector;
deforming a portion of one of the hollow member and the second connector to mechanically attach and sealingly engage the hollow member and the second connector; and
attaching a master cylinder to the brake booster by positioning a portion of the master cylinder proximate the at least one threaded end of the hollow member and threadingly engaging the at least one threaded end of the hollow member with a threaded fastener.

* * * * *